US011873650B2

(12) United States Patent
Skovajsa

(10) Patent No.: US 11,873,650 B2
(45) Date of Patent: Jan. 16, 2024

(54) COMPOSITE ASSEMBLY OF THE STEEL STRUCTURE FOR LIFTING EQUIPMENT

(71) Applicant: Jiří Skovajsa, Prague (CZ)

(72) Inventor: Jiří Skovajsa, Prague (CZ)

( * ) Notice: Subject to any disclaimer, the term of this patent is extended or adjusted under 35 U.S.C. 154(b) by 358 days.

(21) Appl. No.: 17/255,428

(22) PCT Filed: Jun. 24, 2019

(86) PCT No.: PCT/CZ2019/050029
§ 371 (c)(1),
(2) Date: Dec. 23, 2020

(87) PCT Pub. No.: WO2020/001668
PCT Pub. Date: Jan. 2, 2020

(65) Prior Publication Data

US 2021/0269282 A1 Sep. 2, 2021

(30) Foreign Application Priority Data

Jun. 26, 2018 (CZ) ................................ CZ2018-310

(51) Int. Cl.
*E04F 17/00* (2006.01)
*B66B 7/02* (2006.01)
*B66B 11/00* (2006.01)

(52) U.S. Cl.
CPC ............ *E04F 17/005* (2013.01); *B66B 7/024* (2013.01); *B66B 11/0005* (2013.01)

(58) Field of Classification Search
CPC ........ E04F 17/00; E04F 17/005; B66B 7/024; B66B 11/0005
See application file for complete search history.

(56) References Cited

U.S. PATENT DOCUMENTS

2002/0178687 A1* 12/2002 Eden ......................... E04C 3/30 52/834
2011/0232226 A1* 9/2011 Geyer ....................... E04C 3/30 52/831

FOREIGN PATENT DOCUMENTS

EP 1101882 A1 * 5/2001 ............... B66B 7/02
EP 3222573 A1 * 9/2017 ............. B66B 11/00

(Continued)

*Primary Examiner* — Christine T Cajilig

(57) ABSTRACT

The composite assembly of the steel structure for lifting equipment comprised of the lifting system, into which the lower parts of vertically connected pillars connected to one another by cross-beams are fixed, with a levelling lifting system comprised of lifting plates (11) that are anchored into a concrete recess using chemical bonds via openings (15), with the structure levelling system comprising an adjusting screw (14), adjusting load-bearing nut (12), and safety nut (13), where the adjusting screw (14) passes through the opening in the lifting plate (10) welded onto the lower part of the lowermost pillar (1) of the structure. The vertical connections (3) of individual pillars (1), on the inner sides of both ends fitted with sets of openings mutually arranged at the angle of 90 degrees, are realized by inner connecting pieces (18) with fixed nuts (21), attached by Allen head screws (20) with safety washers having high resistance to spontaneous releasing due to vibrations via a set of openings. Connection of the cross-beam (2) and pillar (1), fitted with fixed integrated nuts (17), screw connections (4) is realized in the front part of the cross-beam (2) closed by the plate (**4*b*) via oval openings (4*a*) on the inner side of the structure by Allen head screws (4*c*), supported by safety washers (4*d*) with high resistance to spontaneous releasing due to vibrations. The connections (4) are also fitted with mechanical protection by safety plates (7), attached by Allen head screws (22) to the fixed nuts (19) attached into the inside of the section on the side of the cross-beams (2**), with (Continued)

corner reinforcements (6) ensuring the stability and perpendicularity of the connection (4) of the pillars (1) and crossbeams (2), further comprising a system for seating the brackets of the guide rails consisting of an oval opening (8) and a T-bolt (16), having a rectangular block (16*b*) in the rear part and a square block (16*a*) on the top of it for fixing and levelling the attached elements of the elevator.

2 Claims, 5 Drawing Sheets

(56) References Cited

FOREIGN PATENT DOCUMENTS

| | | | | |
|---|---|---|---|---|
| EP | 3222573 | A1 | 9/2017 | |
| ES | 1058587 | U | 1/2005 | |
| WO | WO-2006131947 | A2 * | 12/2006 | ......... B66B 11/0005 |
| WO | WO 2006131947 | A3 | 8/2007 | |

* cited by examiner

COMPOSITE ASSEMBLY OF THE STEEL STRUCTURE FOR LIFTING EQUIPMENT

TECHNICAL FIELD

The invention deals with self-supporting steel structures with solid or transparent cladding for the installation of elevator technological systems.

BACKGROUND ART

Among solution available on the market are mainly standard self-supporting welded structures. Their main disadvantage is a gradual installation on the construction site utilizing welding, grinding and subsequent painting processes carried out on the site. A compromised precision of the structure manufacture depends on the professional skills and precision of the welders and fitters who carry out the manufacture of the structure. Another disadvantage rests in the risk of fire due to hot material spatter accompanying the welding and grinding operations. A major drawback is of course the prolonged manufacture of the structure on the construction site and, in the case of replacement of the previous elevator technological system, also a longer duration of the elevator unavailability. Among the advantages of welded structures are a high load-bearing capacity and design simplicity allowing the same types of elements to be used for all main vertical and horizontal parts of the structure.

In exceptional cases the state of the art offers pre-manufactured structures with on-site installation that eliminate the need for welding operations on the construction site. Nevertheless, such structures are comprised of in particular open sections or bent metal sheets that cannot attain the stability and design simplicity of standard welded structures and that are not suitable for higher load-bearing capacities, lifting operations and the currently widely employed solutions of elevator technological systems with no engine room applying a higher load on the structures of the elevator shaft. In the known cases of the existing solutions various types of elements are manufactured for the main horizontal and vertical load-bearing elements of the structure. In a majority of cases, the more subtle design requires additional reinforcement of wind cables to attain a higher stability of the structure along with the elevator technological system elements anchoring into the surrounding structures outside the structure of the shaft or using robust reinforcing elements at the level of individual floors. Moreover, if transparent cladding is used, open sections and screws with a low aesthetic value are visible, which is not acceptable for example in the case of interior solutions with higher demands for aesthetic aspects. Furthermore, such assembled structures do not allow the space for the lift cabin to be utilized to the maximum extent in small spaces of stair wells where the possibility of placing the portal onto the landing would extend the space for the lift cabin by up to 100 mm.

Another drawback of the known assembled structures is their difficult placement of the lifting plate onto less even surfaces that is resolved by non-systematic supporting of the corners of the distribution frame by metal sheets with various thickness, or otherwise perfectly flat surfaces are required, the preparation of which is technologically demanding and expensive.

Another drawback of this type of assembled structures is the use of a combination of a loose nut and screw where during assembly a single-head wrench must be used on both sides to eliminate nut spinning when the connections are being completed. For the aforementioned reasons, the elements of the structure are usually designed as opened.

The WO 2006131947 document discloses the structure of an assembled shaft comprised of bent metal sheets connected by screw connections with a loose nut and screw. In addition, the structure is reinforced on individual floors by a perimeter frame providing the height stability of the shaft. The structure is also sufficiently secured by diagonal bracing using steel-wire ropes within the framework of all bays. The structure is placed on a lifting frame that allows the extended part of the structure to be aligned upon its seating.

A drawback of the disclosed solution is the more complex and rather expensive manufacture considering the different sections of the pillars and cross-beams. The only product based on standard series production of the metallurgical industry is large-size metal sheet, the various types of which need to be cut to pieces and bent to obtain made-to-measure elements of the structure for its pillars and cross-beams. Another disadvantage of the open elements is their lower stability limiting the total height of the shaft, a more difficult access for cleaning the structure, the absence of a mechanical barrier of the screw connections protection and a compromised aesthetic aspect in the case of transparent cladding used in the space of stair wells. The use of open sections is necessitated by the use of a combination of a loose nut and screw and the provision of access on both sides of the connections requiring two tools on each side of the screw connection for its retightening.

Among drawbacks of the structure disclosed in the WO 2006131947 publication is also the necessity to use a stabilization frame at the level of individual floors limiting the maximal utilization of space for the shaft where the shaft is installed into stair wells, and also the absence of a system solution of portals to fix the shaft doors. Another drawback can be seen in the designed structure levelling system that on the one hand allows the upper part of the structure to be aligned, but on the other hand does not provide a systematic solution of the issue of uneven surface onto which this lifting frame is placed. With uneven surface, the lifting frame must be non-systematically supported in the corners by spacer metal sheets of various thickness. The final drawback is a complex fixture required for fixing the brackets of the elevator guide rails.

The EP 2162377 document discloses an assembled elevator shaft with complex and rather expensive manufacture of the structure based on a system of bent metal sheets that has a number of openings and screw connections where the crew-nut connection must be used. Among other requirements are a perfectly flat surface for the lifting frame, or a non-systematic supporting of the structure corners by spacer metal sheets where the surface for placing is not sufficiently flat, a general very low stability of the structure that is only suitable for interiors where guide rails can be anchored into the surrounding structures or where guide rails completely assume the load-bearing function. Self-supporting cladding rather than self-supporting structure able to transmit forces from the elevator is concerned. The height of the structure is limited and the space cannot be utilized by extending the portal onto the landing space.

The EP 3222573 document discloses an assembled structure of the elevator shaft with complex and expensive manufacture of the structure fitted with a system of bent metal sheets with a lower total stability of the structure and the absence of fixed connections. A solution based on a simple connection of transverse load-bearing elements to vertical load-bearing elements is concerned. No other problematic parts of elevator structures are addressed.

The CN 106672754 document describes an assembled structure of the elevator shaft with the complex and expensive manufacture of the structure based on bent metal sheets. The structure has a lower level of stability and is suitable for lower indoor platforms rather than full-valued elevators intended for apartment houses. A perfectly flat surface is required onto which the lifting frame needs to be placed, or alternatively, the structure corners must be non-systematically supported by spacer metal sheets where the surface for placing is not perfectly flat. Portals for the shaft doors of the elevator and their anchoring are not covered. It is not possible to utilize space by extending the portal onto the landing space.

The CN 102180397 document discloses a solution of the shaft steel structure assembled in blocks. The aforementioned solution can be employed in particular in exteriors using a crane, by which any possibility of utilization for interiors is eliminated.

The CN105329751 document discloses an assembled structure of the elevator shaft. Among the drawbacks of the aforementioned solution are complex and expensive manufacture due to the system of bent metal sheets, the requirement of perfectly flat surface for placing the lifting frame, or where applicable non-systematic supporting of the structure corners by spacer metal sheets where the surface for placing is not sufficiently flat. The structure has a lower level of stability and is more suitable for lower indoor platforms rather than full-valued elevators intended for apartment houses. No solution of portals for the elevator shaft doors and their anchoring is addressed and the space of landing cannot be utilized by extending the portal.

The CN 203428696 document discloses assembled structures of the elevator shaft for industrial elevators. The design of the shaft is very rough and with diagonal bracing. This solution is not suitable for exposed structures of shafts in apartment houses.

The AU 8115491 document discloses a system of structure for construction elevators. The system is not suitable for standard elevator technological systems employed in apartment houses.

The CN 204096827 document discloses an assembled structure designed in blocks which is more suitable for installations in exteriors where a crane can be employed.

Based on the current state of the art it is assumed that assembled structures require the use of the connection of a screw and loose nut and that it is not possible to design the manufacture of an assembled structure based on unified closed elements that are utilized in welded structures. Therefore, the proposed elements are opened with different sections for pillars and cross-beams of the structure. Assembled structures based on the state of the art are known for lacking the mechanical properties of welded structures and therefore the currently known assembled structures are limited to only small-scale customized production where not such a high load-bearing capacity, stability and mechanical resistance are required. The advantage of the use of unified prefabricated sections for the entire structure therefore remains only on the part of on-site welded structures.

SUMMARY OF INVENTION

The composite assembly of the steel structure for lifting equipment comprised of the lifting system, into which the lower parts of vertically connected pillars connected to one another by cross-beams are fixed, with a level lifting system comprised of lifting plates (11) that are anchored into a concrete recess using chemical bonds via openings (15), with the structure levelling system comprising an adjusting screw (14), adjusting load-bearing nut (12), and safety nut (13), where the adjusting screw (14) passes through the opening in the lifting plate (10) welded onto the lower part of the lowermost pillar (1) of the structure. The vertical connections (3) of individual pillars (1), on the inner sides of both ends fitted with sets of openings mutually arranged at the angle of 90 degrees, are realized by inner connecting pieces (18) with fixed nuts (21), attached by Allen head screws (20) with safety washers having high resistance to spontaneous releasing due to vibrations via a set of openings. Connection of the cross-beam (2) and pillar (1), fitted with fixed integrated nuts (17), screw connections (4) is realized in the front part of the cross-beam (2) closed by the plate (4*b*) via oval openings (4*a*) on the inner side of the structure by Allen head screws (4*c*), supported by safety washers (4*d*) with high resistance to spontaneous releasing due to vibrations. The connections (4) are also fitted with mechanical protection by safety plates (7), attached by Allen head screws (22) to the fixed nuts (19) attached into the inside of the section on the side of the cross-beams (2), with corner reinforcements (6) ensuring the stability and perpendicularity of the connection (4) of the pillars (1) and cross-beams (2), further comprising a system for seating the brackets of the guide rails consisting of an oval opening (8) and a T-bolt (16), having a rectangular block (16*b*) in the rear part and a square block (16*a*) on it for fixing and levelling the attached elements of the elevator.

The composite assembly of the steel structure for lifting equipment preferably has all pillars (1) and cross-beams (2) made of identical standardized closed sections.

The disclosed solution simplifies and reduces the price of manufacture and installation by using identical series-produced elements for horizontal as well as vertical elements of the structure, increases the overall stability of the structure, improves its aesthetic impression, simplifies the foundation of the shaft, maximizes the space for the elevator technological system in the case of additional installations in a confined space for the elevator shaft inside the existing stair wells.

The disclosed assembled structure combines the advantages of the use of unified elements for cross-beams and pillars as in the case of welded structures, including their higher load-bearing capacity, and the advantages of assembled structures resting in the possibility of manufacture in the shop and quick on-site installation. The disclosed structure allows the design simplicity and load-bearing capacity of standard welded structures to be utilized without additional pre-manufacturing operations.

EXAMPLES

An example of the embodiment of the composite assembly of the steel structure for lifting equipment is provided in FIGS. 1 through 6.

Figure 1:
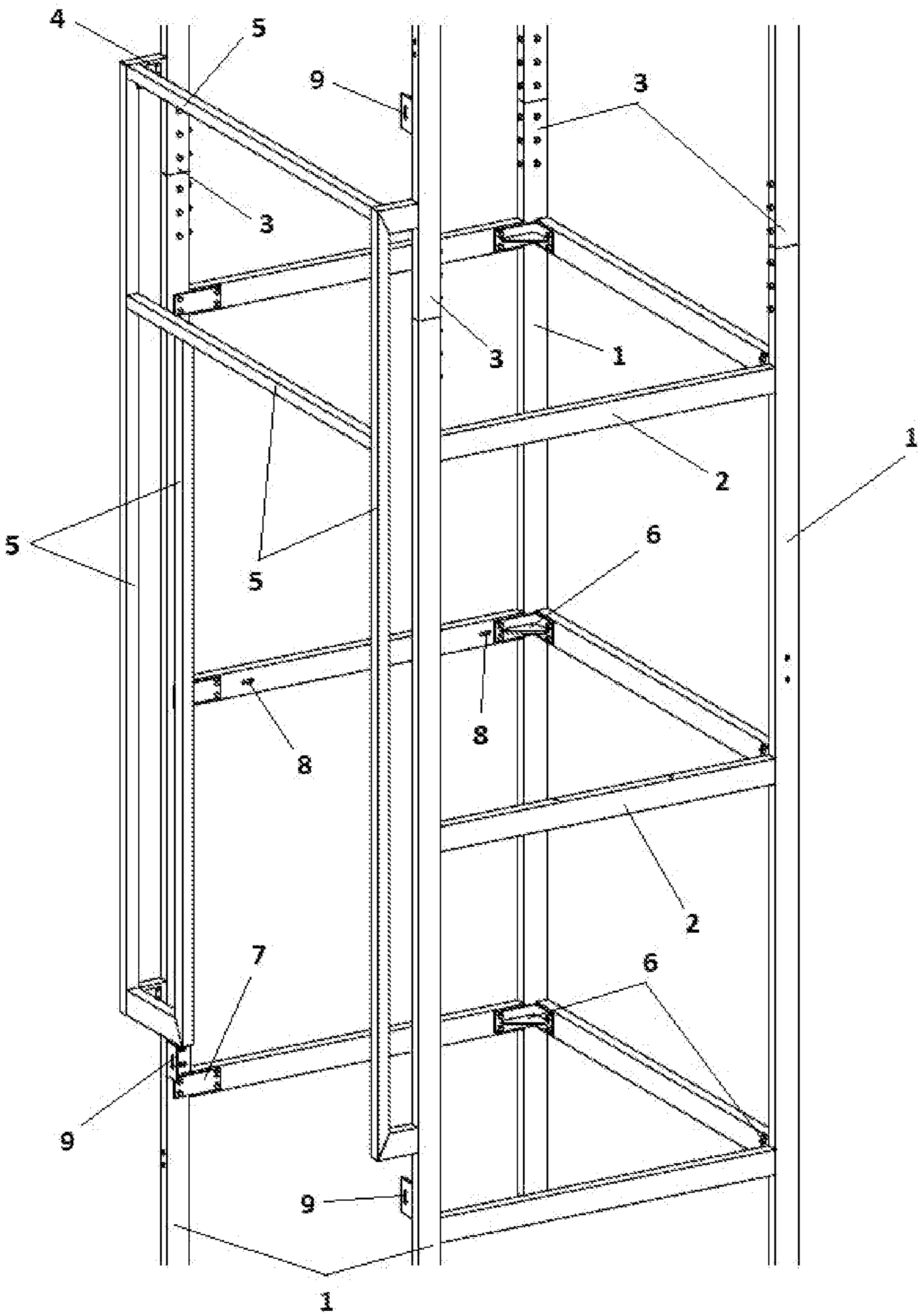
FIG. 1 illustrates a section of the structure model.

The structure, as shown in FIG. 1 is designed of steel closed sections that as the main elements are series-produced by the metallurgical industry processes. The pillars 2 and cross-beams 1 are manufactured from the same types of closed sections. The lengths of individual elements are made to measure based on the dimensions of the elevator technological system and space available for the shaft.

Figure 5:
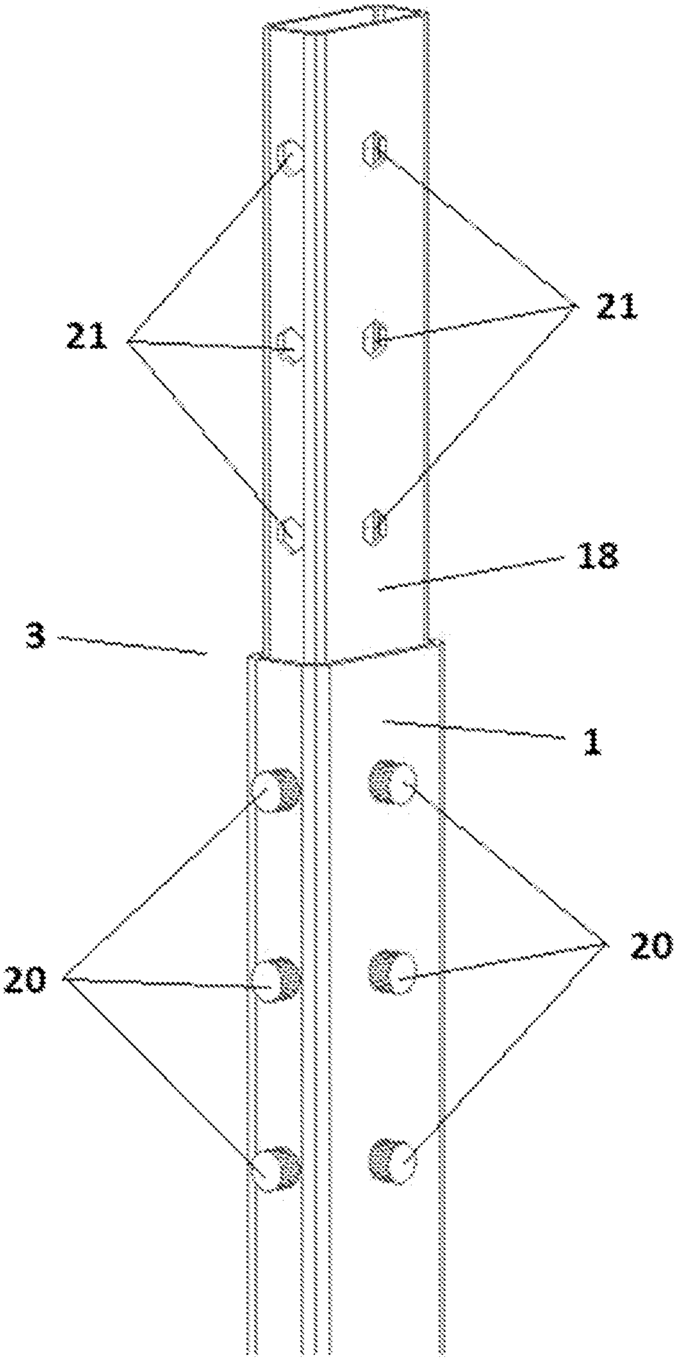
FIG. 5 illustrates the connection of the vertical load-bearing elements of the structure.
Figure 6:
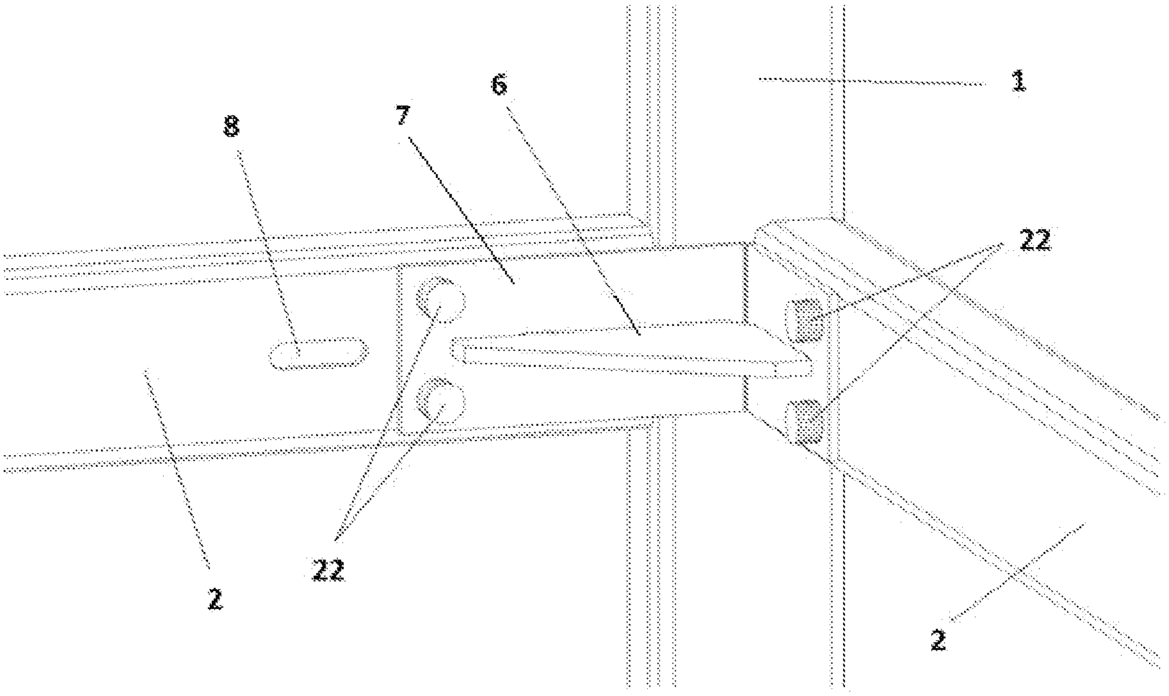
FIG. 6 illustrates the corner reinforcement of the horizontal elements.

The vertical elements 1 in the connections 3, as shown in FIG. 5, exert pressure on one another, which ensures a high load-bearing capacity of higher structures. They are attached to one another by the connecting pieces 18, which stabilize the mutual position of the connected vertical elements. The connecting piece 18 comprises integrated fixed nuts 21 that are mutually arranged at the angle of 90 degrees. The ends of the connected pillars 1 include a set of openings, through which the screws 20 and fixing washers are screwed through into the connecting pieces 18. When retightening the screws 20 the positions of the elements being connected and aligned are fixed. Thanks to the use of the fixed nuts 21 directly in the connecting piece 18, it is not necessary to use a second tool to hold the loose nut when the connection is being retightened.

Figure 4:
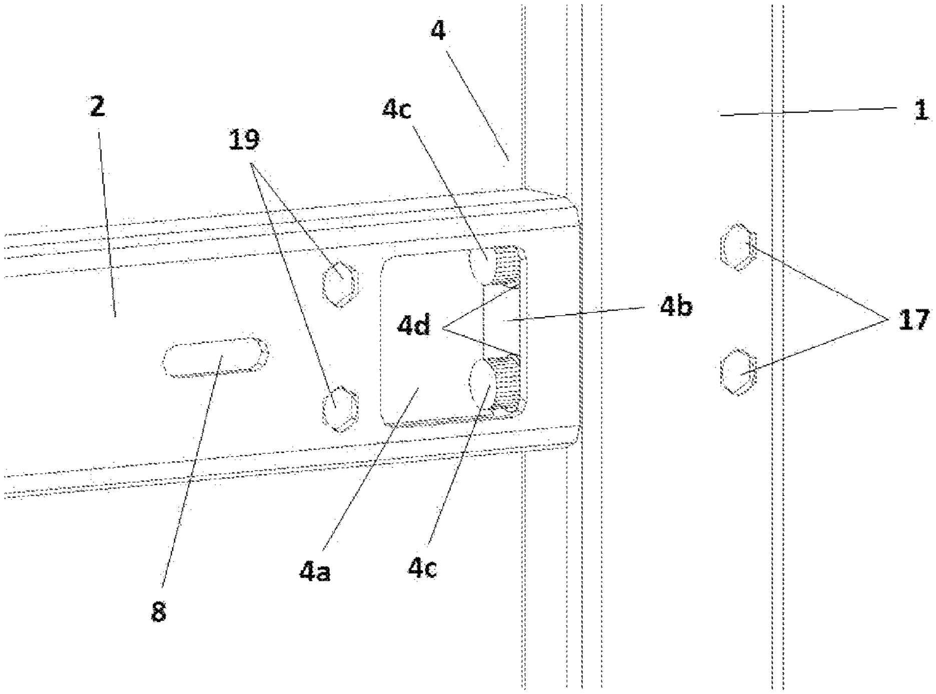
FIG. 4 illustrates the connection of the horizontal and vertical load-bearing elements of the structure.

The pillars 1 are connected to the cross-beams 2 by screw connections 4. In the points of the connections 4, as shown in FIG. 4, the integrated fixed nuts 17 are embedded in vertical elements. The fixed integrated nuts 17 are fitted with screws **4*c* with washers having a high resistance to vibrations, that utilize the plates 4*b* welded in the fronts of the horizontal elements for securing a firm connection of the cross-beams 2 of the structure and the pillars 1. The same system of connection 4 is designed for the connection of the elements of the portals 5** for the shaft doors.

The horizontal load-bearing elements 2 connected into the vertical elements 1 in the front of the structure are covered by the safety plate 7 of the connection of the elements that also ensures the mechanical protection of the connection. In the rear part of the structure, the horizontal elements 2 at one level are mutually arranged at the angle of 90 degrees; these neighbouring connections are covered by the corner reinforcement 6, which mechanically covers the connection 4 and also ensures that the right angle between the neighbouring horizontal elements will be maintained.

Figure 3:
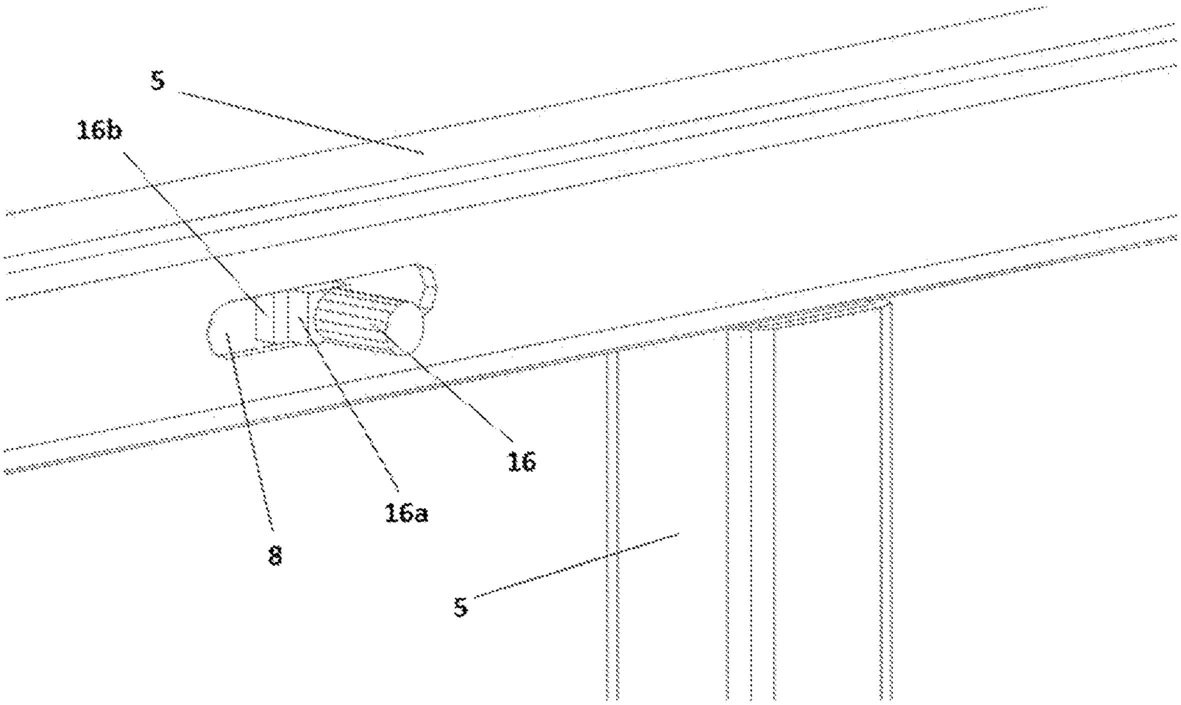
FIG. 3 illustrates the anchoring system of guide rail brackets for the elevator and shaft doors.

For the purpose of easy installation and alignment of the brackets of the guide rails and shaft doors, a system for the connection of the aforementioned elements of the elevator technological system is designed, see FIG. 3. In the horizontal elements 2 and in the top elements of the portal 5 oval openings 8 are designed, into which special T-bolts 16 are inserted that have in their rear part a rectangular block **16*b* with a square block 16*a* placed on the top of it. This system allows an easy connection of the elevator technology elements and also an easy replacement of screws in the case that they get damaged. The screw is inserted into the oval opening 8; in the section, it is turned through an angle of 90 degrees and partly pushed out of the section. The rectangular edge of the head of the screw 16*b* is secured by the edges of the opening 8 and the square block 16*a* prevents the T-bolt 16** from subsequent turning when the brackets of the elevator guide rails or shaft doors are connected. Before the connection is completely retightened, horizontal alignment of the connected elements of the brackets of the guide rails and shaft doors is possible.

Figure 2:
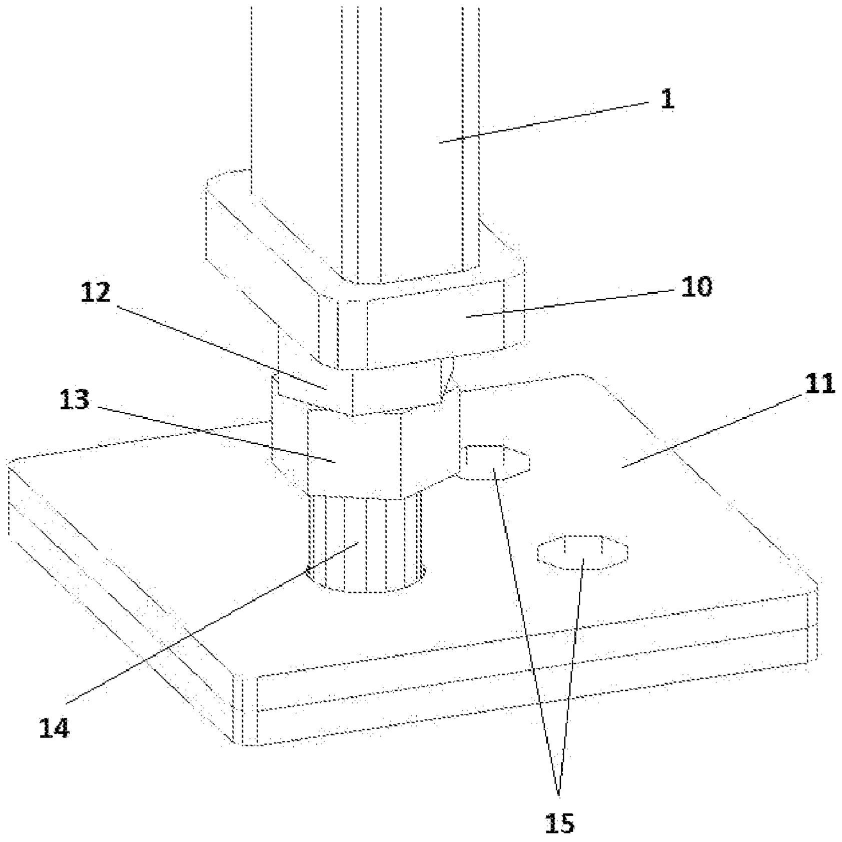
FIG. 2 illustrates the structure lifting.

The entire structure of the shaft is lifted on the designed structure levelling system, see FIG. 2, that is independent of a flat surface under the shaft and does not require any support from underneath by any spacer metal sheets. The distribution plate 11 is anchored via the openings 15 into the concrete foundation of the structure using chemical bonds. On the distribution plate 11, the adjusting screw is placed, on which the lifting plate 10 is inserted via the opening; the lifting plate is welded onto the bottom part of the vertical load-bearing elements 1 of the structure. This element can be gradually aligned up to the required height via the lifting adjusting nut 12, which means that the whole structure can be levelled. Then the connection can be secured by the safety nut 13.

Under the level of individual floors, the structure is anchored via chemical bonds into the landings via the L-shaped anchors 9. These anchors comprise vertical oval connections for the transmission of the possible dilatation of the structure. The angle pieces further comprise oval openings in the longitudinal direction that may be extended before the structure where necessary, unless the anchoring surface of the landings is in the exact vertical line with the structure shaft. These angle pieces are connected to the structure by two screws with washers resistant to vibrations and loosening. The nuts are again inserted directly into the structure to eliminate the necessity of two tools required for retightening the screw and nut.

The main parts of the structure, see FIG. 1, are assembled from the main load-bearing pillars of the structure 1, to which individual joint connections of the structure 2 are connected. To improve the stability of the structure, the joint connections in the corners are further connected by corner reinforcements 6 ensuring that the right angle will be maintained in the connections. The pillars themselves in the largest lengths of 4.5 m are connected by inner screw connections 4, the detailed drawing of which is provided in FIG. 4. The maximum length of the pillars is by 0.5 m shorter than the standardized lengths of the elevator guide rails. In this way, trouble free transport, handling, and on-site storing are provided. The sufficient total length also ensures the maximum possible stability of the structure, unlike in the case of structures where the installation of the pillars is executed in the place of each cross-beam. The structure itself is reinforced from its front by the extended portal 5. This solution provides the possibility to extend the shaft doors onto the exit landing and enlarge the space for the elevator cabin itself in small shafts.

The lifting of the structure, see FIG. 2, is designed for surfaces that are not perfectly flat. It is comprised of the lifting plate 11 that is anchored into the concrete recess by chemical bonds via the openings 15. In addition, the structure levelling system comprising the adjusting screw 14, adjusting load-bearing nut 12, and the safety nut 13 is provided. The adjusting screw passes through the opening in the lifting plate 10 welded onto the bottom parts of the corner pillars 1 of the structure. This system eliminates the request for the perfectly flat surface or additional supporting of the structure corners by spacer metal sheets.

The anchoring system of the shaft doors into the portals of the structure 5 and the cross-beams 2, see FIG. 3, is provided via the system of the connection of the oval openings 8 and special T-bolts 16. The system allows comfortable installation and possible replacement of the bolt stem without the necessity of intervention in the structure. The T-bolt 16 is inserted in a groove by its flat side, then turned through an angle of 90 degrees and extended; using the block above the T-head it is then fixed in the groove against rotation and extension. The same system is used for the anchoring of the brackets for guide rails into the cross-beams of the structure.

Connecting the main load-bearing elements of the structure, i.e. the cross-beams 2 and pillars 1, see FIG. 4, is provided by the oval openings 4*a* on the inner side of the shaft. In the front sides, the cross-beams are closed by the plate 4*b*, which is tightened via the Allen head screws 4*c* to the pillars 1 of the structure, in which threads are integrated, the result of which is a simplified installation process as it is not necessary to hold the loose nut on the other side. The stability of the connection is ensured by washers under the screws with a high resistance to unintentional release and release due to vibrations.

The openings in the cross-beams are covered by the safety plates 7 with the corner reinforcements 6 providing the general aesthetic closing of the opened parts of the structure. The plates and reinforcements are attached by Allen head screws 22 into fixed nuts 19 attached inside the section on the part of the cross-beams 2. Compared to opened sections C, the closed sections are considerably more stable and give a better aesthetic impression. In addition, the connecting elements are better protected due to the overall closing.

The vertical elements 1 in the connections 3, as provided in FIG. 5, exert pressure on one another, which ensures a high load-bearing capacity of higher structures. They are attached to one another by the connecting pieces 18, which stabilize the mutual position of the connected vertical elements. The connecting piece 18 comprises embedded fixed nuts 21 that are mutually arranged at an angle of 90 degrees. The ends of the connected pillars 1 include a set of openings, through which the screws 20 and fixing washers are screwed through into the connecting pieces 18. When retightening the screws, the positions of the elements being connected are aligned and fixed.

The advantage of the disclosed solution is the protection of the inner load-bearing connections of the structure that are completely closed in the horizontal elements of the structure.

Considering the work experience in the field of elevator technology implementation designing, the described solution of the elevator self-supporting assembled structure comprehensively addresses the drawbacks of the standard methods of solution currently used and allows unified series-produced elements to be utilized for the main load-bearing elements of the assembled structure. The solution simplifies the installation process by the elimination of the necessity to use two tools to retighten screw connections. The necessity of non-systematic supporting of the corners of the structure to level the structure on an uneven surface is eliminated. The installation of the elevator technological system into the shaft structure is simplified by a simple, effective, and aesthetic system of anchoring that allows additional alignment of the elevator technological system elements to be implemented in the shaft. The design maintains the stability and load-bearing capacity of the structure without the necessity of additional stabilization elements, and in general simplifies the manufacture of the structure by eliminating the processes of cutting and bending metal sheets for the manufacture of load-bearing elements. In addition, the design allows the maximal utilization of the space for the installation of the shaft in smaller spaces of stair wells by utilizing an extended portal.

The installation of the structure does not require any special professional team, and after training and provided that the procedures of installation specified in the installation manual and occupational safety are adhered to, the installation may be executed by the fitters who make the installation of the elevator technological system, by which the necessity to coordinate several teams on site is eliminated.

The connections are realized by unified screws thus eliminating any possible mix-up and errors during installation. The threads are installed directly into the elements and it is not necessary to use two tools for holding and retightening individual connections.

INDUSTRIAL APPLICABILITY

The composite assembly of the steel structure for lifting equipment according to the invention is repeatedly manufacturable and usable for the installation of elevator technological systems.

What is claimed is:

1. A composite assembly of a steel structure for lifting equipment comprised of a lifting system, into which lower parts of a system of vertically connected pillars connected to one another by cross-beams are fixed, characterized in that a levelling lifting system is comprised of distribution plates that are anchored into a concrete recess using chemical bonds via openings, with a structure levelling system comprising an adjusting screw, adjusting load-bearing nut, and a safety nut, where the adjusting screw passes through an opening in a lifting plate welded onto lower part of a lowermost pillar of the steel structure and vertical connections of the lowermost pillars, on inner sides of both ends fitted with sets of openings mutually arranged at the angle of 90 degrees, are realized by inner connecting pieces with a first set of fixed nuts, attached using a first set of Allen head screws with safety washers having a resistance to spontaneous loosening due to vibrations via a set of openings, and a connection of a cross-beam and the lowermost pillar, fitted with fixed integrated nuts, screw connections is realized in the face of the cross-beam closed by a plate via oval openings on the inner side of the steel structure by a second set of Allen head screws supported by safety washers with the resistance to spontaneous loosening due to vibrations, where the screw connections are also fitted with mechanical protection by safety plates, attached by a third set of Allen head screws to a second set of fixed nuts attached into the inside of a section on the side of the cross-beams, with corner reinforcements ensuring the stability and perpendicularity of the screw connection of the lowermost pillars and cross-beams, further comprising a system for seating a bracket of guide rails consisting of an oval opening and a T-bolt, having a rectangular block in rear part and a square block on top of it for fixing and levelling attached elements of an elevator.

2. The composite assembly of the steel structure for lifting equipment according to the claim 1, characterized in that all pillars and cross-beams are made of identical closed sections.

* * * * *